July 4, 1967  E. W. LANDON  3,329,274
JET-SPRAY TUBE AND DIVERTER VALVE FOR DISC-TYPE FILTER
Filed Jan. 14, 1966  2 Sheets-Sheet 1
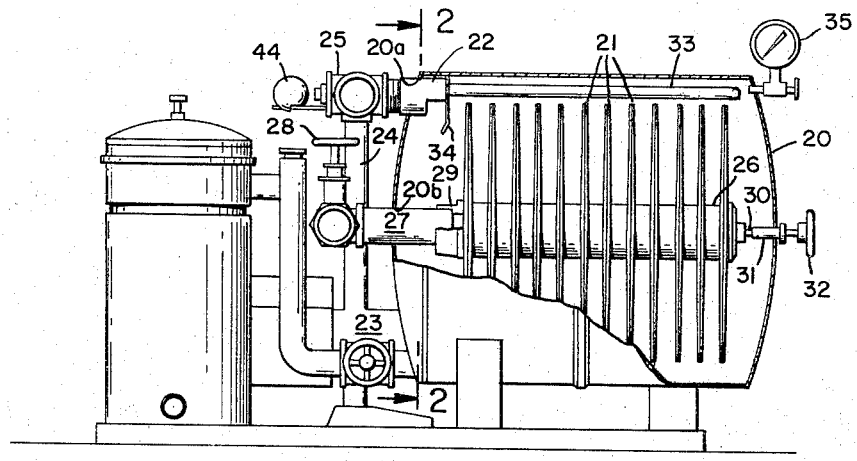
FIG_1
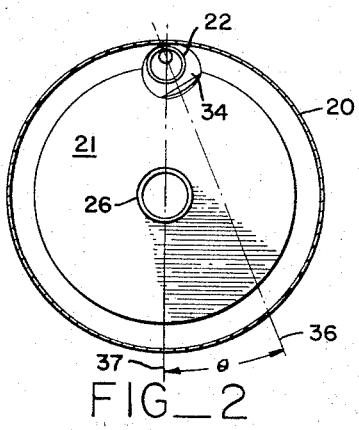
FIG_2
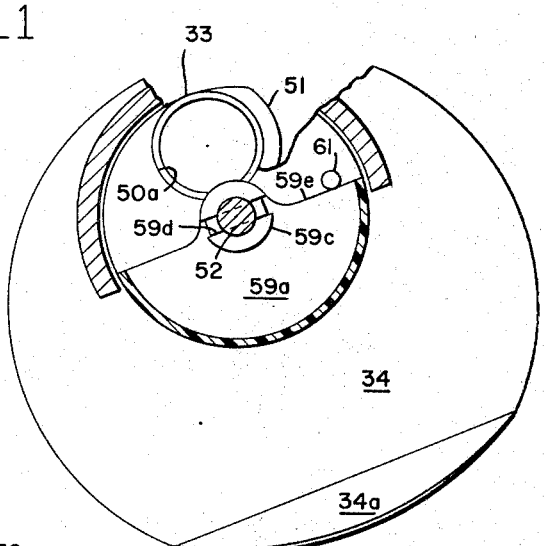
FIG_9
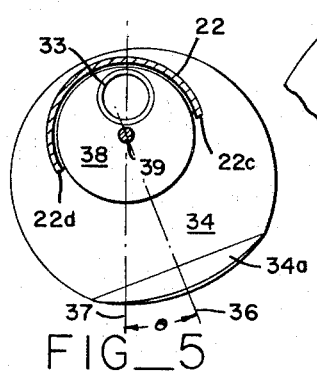
FIG_5
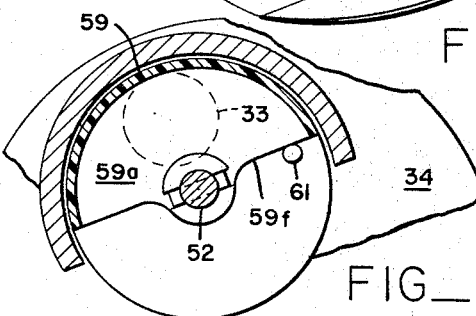
FIG_10
INVENTOR
EVERETT W. LANDON
BY
Mellin, Moore & Weissenberger
ATTORNEYS

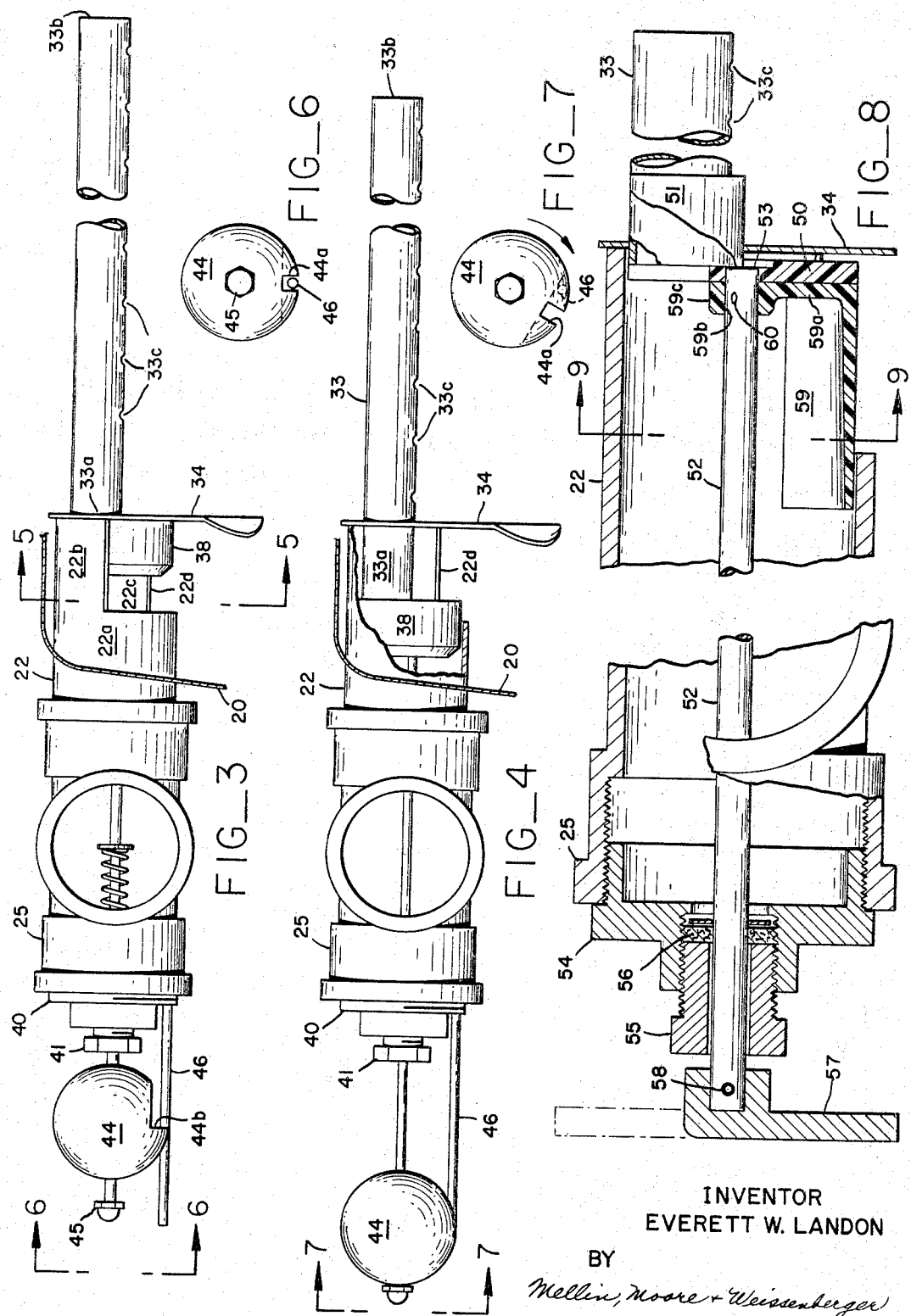

United States Patent Office 3,329,274
Patented July 4, 1967

3,329,274
JET-SPRAY TUBE AND DIVERTER VALVE FOR DISC-TYPE FILTER
Everett W. Landon, San Mateo, Calif., assignor to Landon, Inc., North Hollywood, Calif., a corporation of California
Filed Jan. 14, 1966, Ser. No. 520,751
9 Claims. (Cl. 210—334)

This is a continuation-in-part of U.S. application S.N. 456,894, filed May 6, 1965, now U.S. Patent No. 3,297,-163.

This invention relates to a spray tube and diverter valve particularly useful in association with a disc-type filter. It also relates to a novel inlet conduit for directing unfiltered fluid under pressure into the filter tank.

The disc-type filter with which the present invention is associated is commonly used as a swimming pool filter. It consists of a tank having a plurality of axially disposed hollow discs spaced substantially the full length thereof. The discs are customarily formed with fabric walls which are coated with diatomaceous earth to form a water-permeable filter element. Unfiltered water is circulated in the tank, forced through the diatomaceous earth-coated, water-permeable walls of the discs, into an axially disposed tubular conduit common to each of the discs, and then out of the tank through the conduit. Foreign particles suspended in the unfiltered water are deposited on the diatomaceous earth coating.

A disc-type filter is described in detail in Pace, U.S. Patent No. 2,826,307, entitled "Fluid Recirculation Systems."

Such disc-type filters must, of course, be periodically cleaned, which may be done to some degree by backwashing (reversing the direction of flow through the filter) and to a maximum degree by "bumping" (removing the diatomaceous earth entirely and subsequently recoating the discs with clean diatomaceous earth).

The "bumping" operation can be accomplished by removing the discs from the tank and manually washing the diatomaceous earth and dirt off the filter discs. Complete removal of the disc elements for cleaning is undesirable, however, because of the inconvenience associated with it. Accordingly, means for cleaning the disc elements in place have been provided by the prior art.

The customary method of cleaning the disc elements in place relies on a jet-spray tube disposed in the tank with its longitudinal axis generally perpendicular to the discs. The tube is provided with small openings pointed toward the discs. Water is introduced under pressure into the tube and sprays out of the openings toward the discs with appreciable velocity. The discs are customarily axially rotated as the stream of water impinges upon the exterior thereof so that the disc elements are uniformly cleaned. The in-place cleaning operation thus results in "hosing down" the disc-type filter elements and, due to the velocity of the jet spray from the tube, the diatomaceous earth is washed or forcibly "bumped" from the fabric-type wall of the filter disc.

Such apparatus is shown in my copending application entitled "Jet-Washed Rotatable Filters," Ser. No. 456,-894, filed May 6, 1945, as a continuation of an earlier application of the same name, Ser. No. 146,748, filed Oct. 23, 1961, of which this is a continuation-in-part.

The apparatus of the prior art accordingly provides a satisfactory means for cleaning or "bumping" the disc elements in place without dismantling the bank. The prior art has not, however, provided any means for cleaning the spray tube itself, short of opening the tank and cleaning the spray tube in place. In other words, the spray tubes of the prior art have not been removable from the tank or are removable only by a drastic dismantling or disassembly of the filter. Moreover, the apparatus of the prior art has generally required a distinct valve and conduit system (apart from the main filter stream) for introducing water into the spray tube. And the apparatus of the prior art has the additional shortcoming of introducing water into the tank during the normal filter operation (as distinguished from the "bumping" operation) in such a way that dirt and sediment tends to collect at the bottom thereof.

It is accordingly an object of the present invention to provide a disc-type filter with a spray tube that is conveniently and simply removable from the tank for cleaning, without any appreciable disassembly of the tank.

It is a further object to provide a spray tube operable in association with the main inlet of the tank through the use of a diverter valve, to thereby eliminate the need for a distinct valve and conduit system to introduce water into the spray tube.

It is a further object to provide an inlet conduit which directs the unfiltered water into the tank at an angle relative to a vertical axial plane so as to cause a helical or swirling path of circulation in the tank, to thereby prevent the collection of dirt and sediment on the bottom thereof.

It is a further object to provide apparatus as above described and means exterior of said tank for conveniently operating said diverter valve to discriminately and selectively introduce water from the main filter stream at the tank inlet into the spray tube.

Each of the above objects is fulfilled by the apparatus shown in the drawings wherein:

FIG. 1 is a side view of a filter system with which the present invention is associated. A portion of the tank is broken away to reveal the disc-type filter and its relationship with the tank inlet and spray tube.

FIG. 2 is a sectional view taken on the line 2—2 of FIG. 1.

FIG. 3 is a side view of the spray tube, a section of the tank, the inlet conduit, and a piston-type diverter valve.

FIG. 4 is a side view of the apparatus shown in FIG. 3 and differs from FIG. 3 in that the diverter valve is set to divert water from the normal inlet stream into the spray tube.

FIG. 5 is a sectional view taken on the line 5—5 of FIG. 3.

FIG. 6 is an end view of the ball-type handle for operating the diverter valve of FIGS. 3 and 4 and is taken on the line 6—6 of FIG. 3.

FIG. 7 is an end view of the ball-type handle when the diverter valve is set as shown in FIG. 4 and is taken on the line 7—7 of FIG. 4.

FIG. 8 is a broken side view partially in section of the spray tube assembly shown in FIGS. 3 and 4. FIG. 8 differs from the apparatus shown in FIGS. 3 and 4, however, in that a gate-type diverter valve is shown as distinguished from the piston-type shown in FIGS. 3 and 4. FIG. 8 shows the T (shown in FIGS. 3 and 4) broken and shows the spray tube with a considerable length removed. The gate-type diverter valve is set to divert water from the inlet into the spray tube.

FIG. 9 is a sectional view taken on the line 9—9 of FIG. 8.

FIG. 10 is similar to the view shown in FIG. 9 but shows the gate-type diverter valve set to conduct water into the tank for the normal filter operation. In other words, the gate-type valve is not set to divert water into the spray tube in FIG. 10.

With reference primarily to FIG. 1, the invention generally includes a tank 20, having a plurality of disc-type filter elements 21 axially disposed and spaced therein. The tank has an inlet 20a and an outlet 20b. An inlet conduit or nipple 22 is axially disposed in inlet 20a for conducting unfiltered water into the tank. Water is circulated by means of pump 23, which communicates with the outlet or drain from the swimming pool and pumps water from the swimming pool through conduit 24 into T 25 and then into inlet conduit or nipple 22. The unfiltered water is forced through the diatomaceous earth-coated walls of hollow disc elements 21 and into the axially disposed tubular conduit 26 common to each of the discs 21. Outlet conduit or nipple 27 communicates with tubular conduit 26 for the purpose of conducting filtered water from tank 20 through valve 28, and back into the swimming pool.

Filter elements 21 are rotatable with tubular conduit 26 about the longitudinal axis of tank 20 through the provision of hub 29, shaft 30, seal 31 and hand wheel 32.

Spray tube 33 is disposed with an open end in communication with inlet conduit 22 with its longitudinal axis generally perpendicular to the discs 21. Spray tube 33 has a plurality of spaced openings extending substantially the length thereof and pointing toward discs 21. Valve means is provided in association with inlet conduit 22 for selectively and discriminately diverting water from inlet conduit 22 into spray tube 33 for the purpose of spraying discs 21 with a high-velocity stream of water to accomplish the "bumping" operation described above. The valve means is more particularly described below.

Baffle 34 is provided for the purpose of directing and controlling the general direction or path of discharge of unfiltered water from inlet conduit 22 into tank 20 during the normal filtering operation.

A pressure gauge 35 is provided as shown.

The majority of elements are made from stainless steel, and the filter system is designed to operate under a pressure of 40 p.s.i.

The present invention, used in association with the apparatus described above and shown in FIG. 1, resides more particularly in inlet conduit 22, spray tube 33 and the valve means for diverting water from inlet conduit 22 into spray tube 33. Accordingly, with the foregoing general description of the filter system, the specific features of the invention may be described in detail with reference to FIGS. 2–10.

With reference to FIGS. 1, 2, 3 and 5, inlet conduit or nipple 22 is axially disposed in tank inlet 20a and communicates with T 25. Inlet conduit 22 is formed with a cylindrical portion or section 22a and an integral semi-cylindrical portion or section 22b. Semi-cylindrical portion 22b is defined primarily by substantially diametrically opposed, longitudinally extending edges 22c and 22d, best seen in FIGS. 3 and 5. Edges 22c and 22d, accordingly, define a plane. With the semi-cylindrical end of inlet conduit 22 closed or blocked, semi-cylindrical portion 22b of inlet conduit 22 represents an outlet through which unfiltered water may pass into tank 20. Unfiltered water discharging from inlet conduit 22 is accordingly directed along a path which may be referred to as a mean axis of discharge from inlet conduit 22. The mean axis of discharge is perpendicular to the plane defined by edges 22c and 22d.

Inlet conduit 22 is positioned in tank inlet 20a in a critical manner. More particularly, with reference to FIGS. 2 and 5, inlet conduit or nipple 22 is positioned so that the mean axis of discharge 36 (perpendicular to the plane defined by edges 22c and 22d) is at least 15° from the plane 37 passing through the longitudinal axis of the tank and the longitudinal axis of the nipple 22. It is preferred that the angle be about 22½° as shown at angle $\theta$ in FIG. 2.

The critical disposition of nipple 22 creates a swirling or helical path of water in tank 20. Thus accumulation of dirt or sediment at the bottom of tank 20 is prevented.

Although not critical, baffle 34 is provided in association with inlet conduit or nipple 22 to further control the mean axis of discharge of unfiltered water from inlet conduit 22. Baffle 34 extends transversely across the semi-cylindrical end of inlet conduit 22 and is provided with an opening to accommodate spray tube 33. It extends beyond the cross-sectional limit of inlet conduit 22 toward filter discs of claim 1 and is best described with reference to FIG. 5. It includes a face 34a which is bent to lie in a plane perpendicular to the plane defined by mean axis of discharge 36 and the longitudinal axis of inlet conduit or nipple 22. Face 34a generally points toward outlet 20b.

Spray tube 33 may be conveniently described with reference to FIGS. 1 and 3. It consists of a hollow tube having an open end at 33a and a closed end at 33b. A plurality of openings 33c extend longitudinally substantially the length thereof and tube 33 is disposed in tank 20 with openings 33c pointing toward filter discs 21. Open end 33a communicates with the semi-cylindrical portion 22b of nipple 22. Accordingly, unfiltered water may be diverted by valve means described below from inlet conduit 22, into spray tube 33 and out of openings 33c to thereby spray against discs 21 to wash off the diatomaceous earth. As the discs 21 are sprayed, wheel 32 (see FIG. 1) is rotated so that discs 21 also rotate and are uniformly exposed to the spray from spray tube 33.

Two types of diverter valves are shown. A piston-type diverter valve is shown in FIG. 3–7. A gate-type diverter valve is shown in FIGS. 8–10. In each case the diverter valve provides a means for diverting unfiltered water from inlet conduit or nipple 22 into spray tube 33 and a means for blocking or bypassing spray tube 33, thereby allowing discharge from inlet conduit 22 into tank 20 in the normal filter operation.

With reference to FIGS. 3–7, the piston-type diverter valve includes piston 38, which is formed with an outside diameter which corresponds (with some tolerance) to the inside diameter of inlet conduit or nipple 22. Rod 39 is axially fixed to piston 38 and extends through inlet conduit 22 and T 25. The area between rod 39 and T 25 is sealed by means of plug 40 and rod guide 41. Rod 39 is accordingly reciprocable in rod guide 41 to thereby reciprocate piston 38 from the position shown in FIG. 3 to the position shown in FIG. 4. Collar 42 and helical spring 43 are provided to resiliently urge rod 39 and piston 38 to the right (as viewed in FIGS. 3 and 4).

Ball-type handle 44 is sliable on rod 39 and retained by cap 45. It includes a notch 44a which accommodates retaining rod 46 (see FIG. 6), and it also includes a shoulder 44b disposed perpendicularly to rod 39.

Piston 38 is penetrated by spray tube 33, as best seen in FIG. 5, so that spray tube 33 is in communication with inlet conduit 22.

The piston-type diverter valve of FIGS. 3–7 may be set either in a nipple-open, tube-closed position as shown in FIG. 3, or in a nipple-closed, tube-open position as shown in FIG. 4. FIG. 3 shows the position of the valve for normal filtering operation. In the view of FIG. 3 very little, if any, unfiltered water is diverted from inlet conduit 22 into spray tube 33 and the water is allowed to discharge from inlet conduit 22 into tank 20. FIG. 4 shows the position in which the valve is set when it is desired to divert water from inlet conduit 22 into tube 33 for the purpose of "bumping" filter discs 21.

The piston-type valve is held in the position for normal filter operation by means of spring 43, in compression against the inside surface of plug 40 and collar 42.

The valve is set in the "bumping" position by retracting ball-type handle 44, rod 39 and piston 38 into the position shown in FIG. 4. Piston 38 enters cylindrical portion 22a of inlet conduit 22 to thereby block or prevent normal discharge. The valve is held in that position by shoulder 44b of ball-type handle 44 in engagement with retaining rod 46 as best seen in FIGS. 4 and 7. When the bumping operation is completed, ball-type handle 44 is released from retaining rod 46 and spring 43 places the piston and rod into the position for normal filter operation.

A gate-type diverter valve appears in FIGS. 8–10. It includes a baffle member 50 which corresponds in diameter to the inside diameter of inlet conduit 22 and is disposed within the semi-cylindrical portion 22b thereof, as best seen in FIG. 8. Baffle member 50 includes opening 50a, which is defined primarily by integrally formed collar 51. Baffle member 50 and collar 51 are preferably formed of a suitable plastic, and spray tube 33 is secured tightly in collar 51 as shown in FIGS. 8 and 9.

Rod 52 is rotatably and axially mounted in baffle member 50 with the aid of a flanged retaining ring 53 seated therein. Rod 52 extends through inlet conduit 22 and T 25. The area between rod 52 and T 25 is sealed by plug 54 and rod guide 55. Packing 56 is also provided to efficiently seal the rod in plug 54. A handle 57 is non-rotatably fixed to rod 52 by means of roll pin 58. Rod 52 is accordingly rotatable about its longitudinal axis by rotating or pivoting handle 57.

A semi-cylindrical gate 59 characterizes the gate-type valve shown in FIGS. 8–10. Gate 59 has a closed end 59a and an axially disposed mounting aperture 59b in boss 59c. As best seen in FIGS. 8 and 9, gate 59 is non-rotatably mounted to rod 52 by means of roll pin 60 which passes through rod 52 and notches 59d provided in boss 59c. Gate 59 is further mounted with closed-end portion 59a in engagement with baffle member 50 and with the outside diameter (which is chosen to correspond with the inside diameter of nipple 22) seated inside cylindrical portion 22a of nipple 22.

Semi-cylindrical gate 59 is rotatable about the axis of rod 52 from the position shown in FIGS. 8 and 9 to the position shown in FIG. 10. In the position shown in FIGS. 8 and 9, gate 59 prevents discharge from nipple 22 and diverts the unfiltered water into spray tube 33, which communicates with nipple 22 through baffle member 50. It should be noted that due to the semi-cylindrical design of gate 59, when in the position shown in FIGS. 8 and 9, no significant portion of gate 59 covers openings 50a of baffle member 50.

Gate member 59 may be pivoted by means of handle 57 into the position shown in FIG. 10 which removes gate 59 from the path of discharge from nipple 22 and positions end portion 59a over opening 50a of baffle member 50. Thus gate 59 is placed in the position shown in FIG. 10 for normal filter operation. It is placed in the position shown in FIGS. 8 and 9 for "bumping."

The normal filter position (FIG. 10) and the "bumping" position (FIGS. 8 and 9) is defined by means of stud 61 formed integrally with baffle member 50. Thus stud or stop 61 is positioned on a line intersecting the longitudinal axis of rod 52 at about 90° from a plane passing through the longitudinal axis of rod 52 and the longitudinal axis of tube 33. Stop or stud 61 engages the edge 59e of gate 59, as shown in FIG. 9, to thereby define the "bumping" position of the valve. Stud 61 engages edge 59f of gate 59 as shown in FIG. 10, to thereby define the position of gate 59 for normal filtering.

Both of the spray tube assemblies shown and described are conveniently removably from tank 20. In the case of the piston-type diverter valve and spray tube shown in FIGS. 3–7, plug 40 may be unscrewed from T 25 and the entire assembly may be withdrawn from tank 20 through nipple 22 and T 25. In so removing the diverter valve and spray tube assembly, spray tube 33 is free to withdraw through the opening in baffle 34 and piston 38 passes through nipple 22 and T 25. Accordingly, the piston-type diverter valve and spray tube is conveniently removable for cleaning and may be reinstalled with the same convenience.

Similarly, the gate-type diverter valve and spray tube assembly shown in FIGS. 8–10 may be removed by unscrewing plug 54 and withdrawing spray tube 33, baffle member 50, gate 59 and rod 52 through nipple 22 and T 25. After cleaning, it may be conveniently replaced.

It should be noted that in connection with both of the diverter valves, T 25 has a window which reveals, in the case of the piston-type valve, rod 39, collar 42 and spring 43; and, in the case of the gate-type valve, rod 52. The window is not necessary and may be eliminated.

Variations may be made in the specific embodiment of the invention shown without departing from its scope. The configuration of inlet conduit or nipple 22, for example, may be varied from the cylindrical, semi-cylindrical configuration shown. Such a variation is within the scope of the invention as long as the conduit directs its discharge along the defined path referred to as the mean axis of discharge, within the critical range disclosed and claimed. In addition, various means for actuating the two diverter valves shown may be utilized without departing from the scope of the invention.

Having thus described my invention, I claim:

1. In a filter including a tank having an inlet, an outlet, and a longitudinal axis; and a plurality of disc-type filter elements axially disposed and spaced in said tank, said filter elements communicating with said outlet; the improvement comprising:
    (a) a nipple having a cylindrical portion and a semi-cylindrical portion defined by substantially diametrically opposed longitudinally extending edges, said edges thereby defining a plane and a mean axis of discharge perpendicular to said plane, said nipple being axially disposed in said inlet with said mean axis of discharge at an angle of at least 15° from a plane passing through said longitudinal axis of said tank and the longitudinal axis of said nipple;
    (b) a tube having a closed end, an open end, and a plurality of openings spaced substantially the length thereof;
    (c) means for mounting said tube inside said tank parallel with the longitudinal axis of said tank with said open end in said nipple; and
    (d) valve means for discriminately blocking said nipple and communicating said inlet with said open end of said tube.

2. The improvement of claim 1 wherein said valve means comprises: a piston mounted to and penetrated by said tube, and means for axially moving said piston into and out of said cylindrical portion of said nipple.

3. The improvement of claim 1 and a baffle mounted to said semi-cylindrical portion of said nipple and extending transversely to said longitudinal axis of said nipple, said baffle having a transverse dimension in excess of the diameter of said nipple.

4. The improvement of claim 3 wherein said baffle includes a face lying in a plane perpendicular to the plane defined by said longitudinal axis of said nipple and said mean axis of discharge and pointing toward said outlet.

5. The improvement of claim 2 wherein said means for axially moving said piston into and out of said nipple includes an elongate member axially mounted to said piston and axially extending through said inlet to the exterior of said tank, means sealing the area between said elongate member and said inlet, resilient means urging said piston out of said cylindrical portion of said nipple and handle means attached to said elongate member exterior of said tank for moving said elongate member against said resilient means, and means for releasably maintaining said elongate member against said resilient means with said piston in said cylindrical portion of said nipple.

6. The improvement of claim 1 wherein said valve means comprises: a baffle mounted to and eccentrically penetrated by said tube, said baffle being axially disposed in association with said semi-cylindrical portion of said nipple; a semi-cylindrical gate having an outside diameter corresponding to the inside diameter of said nipple and a closed end; means for mounting said semi-cylindrical gate axially within said cylindrical portion of said nipple with said closed end in engagement with said baffle; and means for axially pivoting said gate from a nipple open-tube closed position with said gate disposed within said semi-cylindrical portion of said nipple and with said closed end covering said tube opening, to a nipple open-tube open position with said gate cylindrically closing said nipple and with said closed end out of covering relationship with said open end of said tube.

7. The improvement of claim 6 wherein said means for mounting said semi-cylindrical gate within said nipple and said means for axially pivoting said gate comprises: an elongate member axially and rotatably mounted to said baffle and extending axially through said inlet to the exterior of said tank; means for sealing the area between said elongate member and said inlet; means for axially and non-rotatably mounting said gate to said elongate member with said closed end in engagement with said baffle.

8. The improvement of claim 7 and a stop on said baffle, said stop being disposed about 90° from a plane passing through said longitudinal axis of said tube and the longitudinal axis of said elongate member.

9. The improvement of claim 6 wherein said baffle includes a face lying in a plane perpendicular to the plane defined by said longitudinal axis of said nipple and said mean axis of discharge and pointing toward said outlet.

References Cited
UNITED STATES PATENTS 3,163,601 12/1964 Ericson et al. _____ 210—333 X
3,285,417 11/1966 Schmidt et al. _____ 210—334 X REUBEN FRIEDMAN, *Primary Examiner.*

F. SPEAR, *Assistant Examiner.*